(12) United States Patent
Dudley et al.

(10) Patent No.: US 8,620,359 B2
(45) Date of Patent: Dec. 31, 2013

(54) SYSTEM AND METHOD FOR ENHANCED MESSAGE DELIVERY

(75) Inventors: William H. Dudley, Lovettsville, VA (US); Marc Rhone Landrum, Centerville, VA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 624 days.

(21) Appl. No.: 12/256,762

(22) Filed: Oct. 23, 2008

(65) Prior Publication Data

US 2009/0111492 A1   Apr. 30, 2009

Related U.S. Application Data (60) Provisional application No. 60/938,708, filed on Oct. 30, 2007.

(51) Int. Cl.
*H04W 4/00* (2009.01)

(52) U.S. Cl.
USPC .......................................... 455/466; 455/433

(58) Field of Classification Search
USPC ........................................................ 455/466
See application file for complete search history.

(56) References Cited

U.S. PATENT DOCUMENTS

| 7,720,912 B2* | 5/2010 | Rooke et al. .................. 709/206 |
|---|---|---|
| 2003/0040300 A1* | 2/2003 | Bodic et al. ................... 455/412 |
| 2003/0193967 A1 | 10/2003 | Fenton et al. |
| 2005/0186969 A1 | 8/2005 | Lohtia |
| 2005/0215250 A1* | 9/2005 | Chava et al. .................. 455/433 |
| 2005/0235048 A1 | 10/2005 | Costa-Requena et al. |
| 2005/0265525 A1* | 12/2005 | Tang et al. ................. 379/88.13 |
| 2006/0099997 A1 | 5/2006 | Ara |
| 2007/0088848 A1* | 4/2007 | Chen et al. .................... 709/238 |
| 2007/0287480 A1* | 12/2007 | Ye .................................. 455/466 |

* cited by examiner

*Primary Examiner* — Liton Miah (74) *Attorney, Agent, or Firm* — Edell, Shapiro & Finnan, LLC (57) ABSTRACT

Coincident with the evolution, maturation, etc. of wireless messaging ecosystems an infrastructure that provides for intelligent and dynamic alternate Multimedia Message Service (MMS) message delivery channels. Occasions may arise where a Mobile Subscriber would like to use their Wireless Device to exchange (for example, MMS) messages but circumstances may prohibit or limit same. On such occasions the MMS messages may be appropriately processed and then routed through one or more alternate message delivery channels such as, possibly inter alia, E-Mail. The infrastructure may optionally leverage the capabilities of a centrally-located Messaging Inter-Carrier Vendor.

16 Claims, 7 Drawing Sheets

SYSTEM AND METHOD FOR ENHANCED MESSAGE DELIVERY

This application claims the benefit of U.S. Provisional Patent Application No. 60/983,708, filed on Oct. 30, 2007, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Multimedia Message Service (MMS), Electronic Mail (E-Mail), etc.

2. Background of the Invention

As the 'wireless revolution' continues to march forward the importance to a Mobile Subscriber (MS)—for example a user of a Wireless Device (WD) such as a mobile telephone, a BlackBerry, etc. that is serviced by a Wireless Carrier (WC)—of their WD grows substantially.

One consequence of such a growing importance is the resulting ubiquitous nature of WDs—i.e., MSs carry them at almost all times and use them for an ever-increasing range of activities.

Coincident with the expanding presence of WDs has been the explosive growth, year over year, in the number of (Short Message Service [SMS], MMS, etc.) messages that have been exchanged by and between WDs. That steady increase shows no sign of abating. For example:

1) As reported by the industry group CTIA (see ctia.org on the World Wide Web [WWW]) in the U.S. there were over 158 billion SMS messages sent during 2006 (representing a 95% increase over 2005) and there were over 2.7 billion MMS messages sent during 2006 (representing a 100% increase over 2005).

2) As reported by the research firm M:Metrics (see mmetrics.com on the WWW), between June 2007 and August 2007 36.0% of MSs aged 18-24 years, 27.2% of MSs aged 13-17 years, and 26.9% of MSs aged 25-34 sent MMS messages.

It is important to note that WDs are all different—e.g., the vendors or manufacturers of WDs (such as, for example, Motorola, Samsung, Nokia, LG, etc.) supply their WDs with different features/functions, different size screens, support for different color depths, varying degrees of support for audio and video information, etc. Among other things, different WDs provide different levels of native support (ranging from no support, to some support, to full and complete support) for different messaging paradigms such as, for example, SMS and MMS. As just one example, Apple's iPhone does not provide native support for MMS.

The specific WD differences that were described above are illustrative only and it will be readily apparent to one of ordinary skill in the relevant art that numerous other differences are easily identified.

Occasions may arise where a MS would like to use their WD to exchange (for example, MMS) messages but circumstances may prohibit or limit same. For example:

1) Their WD may not provide native support for a particular messaging paradigm (such as, for example, MMS).

2) Their physical location may limit the level, type, etc. of WC-supplied service that their WD may enjoy and thus, possibly inter alia, constrain their ability to fully use their WD's native facilities (to, for example, exchange MMS messages).

On such occasions, and on other occasions that would be obvious to one or ordinary skill in the relevant art, it would be desirable to deliver (in the instant example MMS) messages to the WD through one or more alternate message delivery channels such as, possibly inter alia, E-Mail.

The present invention facilitates such alternate message delivery channels and addresses various of the (not insubstantial) infrastructure, etc. challenges that are associated with same.

SUMMARY OF THE INVENTION

In one embodiment of the present invention there is provided a method for delivering MMS messages, including receiving from a WD of an originating MS a MMS message that is addressed to a WD of a destination MS; performing one or more processing step on aspects of the MMS message, including at least querying a routing data repository, yielding possibly among other things a MMS support descriptor for the destination MS' WD; and in response to the MMS support descriptor indicating the absence of MMS support on the destination MS' WD sending (a) portions of the original MMS message and/or (b) transcoded portions of the original MMS message through an alternate message delivery channel.

In the embodiment an alternate message delivery channel may include E-Mail.

Still in accordance with the embodiment, the method may include populating a routing data repository through (a) a real-time query (including for example interrogation of a WC network element [such as a Home Location Register [HLR] and/or interrogation of a WD [through for example the sending of a text-only MMS message]) and/or (b) a data load.

Still in accordance with the embodiment, the method may employ information previously supplied by a MS.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the description that may be found below, further serve to illustrate among other things the principles, structure, and operation of such embodiments. Variations of these embodiments will be apparent to persons of ordinary skill in the relevant art based on the teachings contained herein.

It should be understood that these figures depict embodiments of the invention. Variations of these embodiments will be apparent to persons skilled in the relevant art(s) based on the teachings contained herein.

DETAILED DESCRIPTION

The present invention may leverage the capabilities of a centrally-located, full-featured MICV facility. Reference is made to:

1) U.S. Pat. No. 7,154,901 entitled "INTERMEDIARY NETWORK SYSTEM AND METHOD FOR FACILITATING MESSAGE EXCHANGE BETWEEN WIRELESS NETWORKS" and its associated continuations, and 2) Pending U.S. patent application Ser. No. 10/921,223 entitled "ARCHITECTURE AND METHODS FOR INTER-CARRIER MULTI-MEDIA MESSAGING" and its associated continuations for a description of a MICV, a summary of various of the services/functions/etc. that may be performed by a MICV, and a discussion of the numerous advantages that arise from same.

Figure 1:
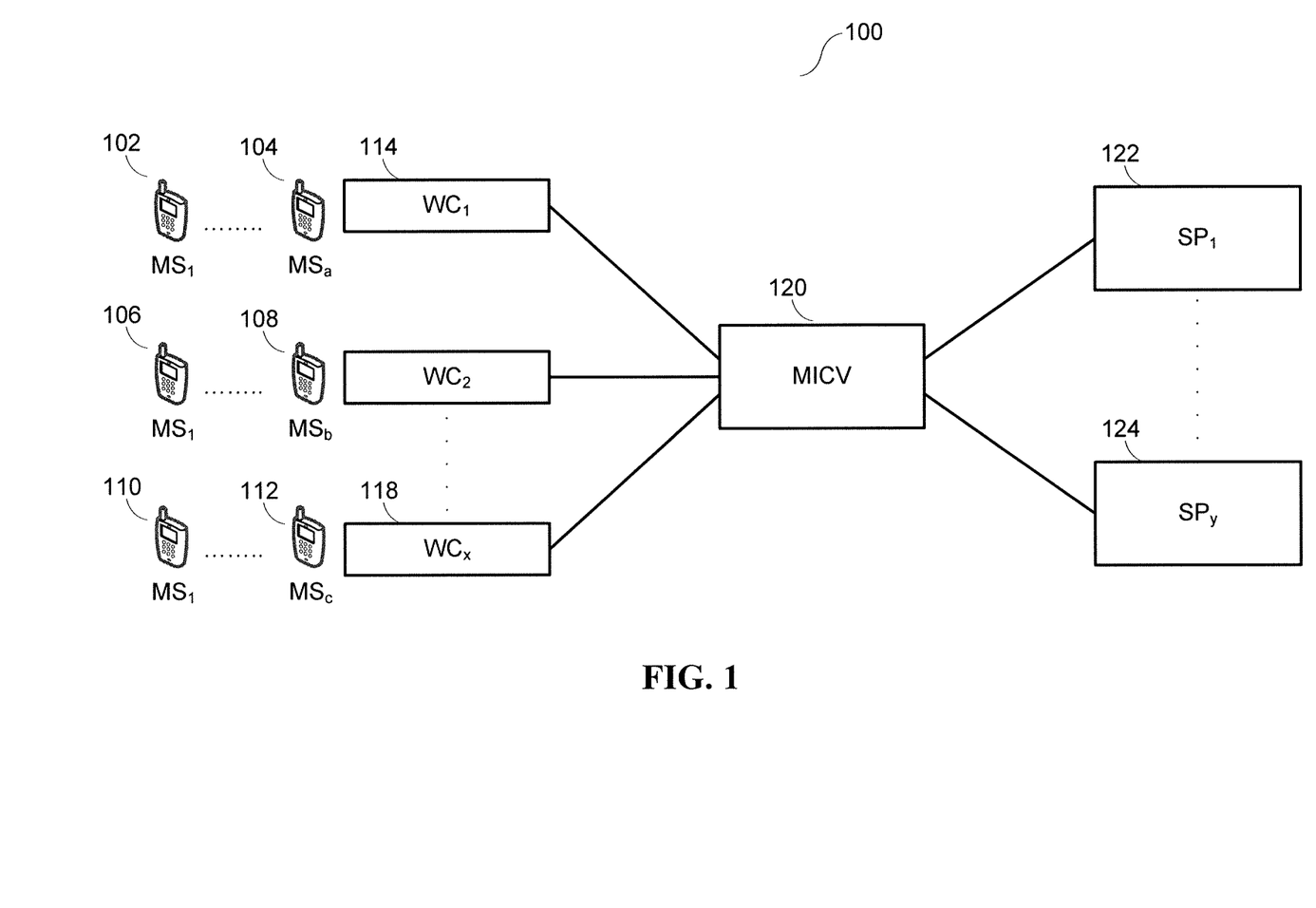
FIG. 1 is a diagrammatic presentation of an exemplary Messaging Inter-Carrier Vendor (MICV).

As illustrated in FIG. 1 and reference numeral 100 a MICV 120 is disposed between, possibly inter alia, multiple WCs ($WC_1$ 114→$WC_x$ 118) on one side and multiple SPs ($SP_1$ 122→$SP_y$ 124) on the other side and thus 'bridges' all of the connected entities. A MICV 120 thus, as one simple example, may offer various E-Mail, SMS/MMS/etc., etc. message routing, formatting, delivery, value-add, etc. capabilities that provide, possibly inter alia:

1) A WC 114→118 (and, by extension, all of the MSs 102→104, 106→108, 110→112 that are serviced by the WC 114→118) with ubiquitous access to a broad universe of SPs 122→124, and 2) A SP 122→124 with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the MS←→MS, MS←→SP, etc. messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV, it will be readily apparent to one of ordinary skill in the relevant art that other arrangements are equally applicable and indeed are fully within the scope of the present invention.

In the discussion below the present invention is described and illustrated as being offered by a SP. A SP may, for example, be realized as a third-party service bureau, an element of a WC or a landline carrier, an element of a MICV, multiple third-party entities working together, etc.

In the discussion below reference is made to messages that are sent, for example, between a MS and a SP. As set forth below, a given 'message' sent between a MS and a SP may actually comprise a series of steps in which the message is received, forwarded and routed between different entities, including possibly inter alia a MS, a WC, a MICV, and a SP.

Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

To better understand the particulars of the present invention consider for a moment a simple hypothetical example—SP $SP_x$ offers a service that has been enhanced or augmented as provided through aspects of the instant invention and Mary, a MS, uses $SP_x$'s service.

Figure 2:
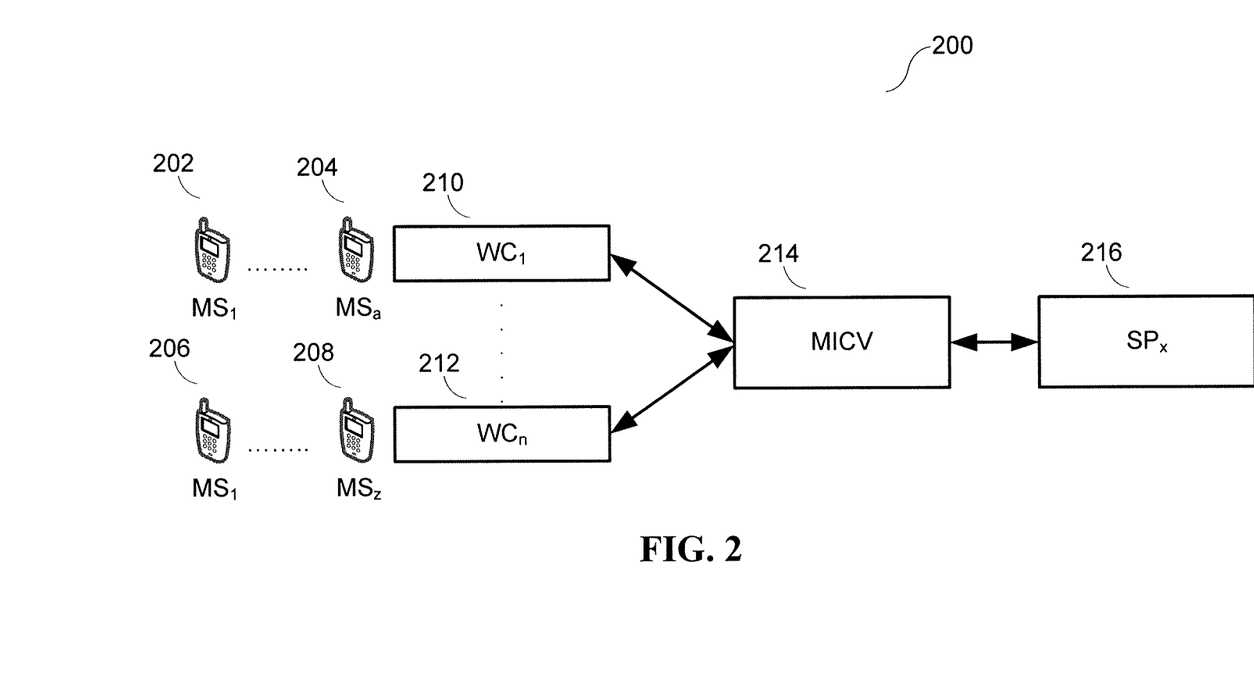
FIG. 2 illustrates one particular arrangement that is possible through aspects of the present invention.

FIG. 2 and reference numeral 200 depict one particular arrangement that may be possible under our hypothetical example. As the diagram portrays, all of the E-Mail, SMS/MMS/etc. messaging traffic of numerous MSs ($MS_1$ 202→$MS_a$ 204 and $MS_1$ 206→$MS_z$ 208, including Mary), serviced by various WCs ($WC_1$ 210→$WC_n$ 212), is exchanged with a MICV 214 and the MICV 214 is connected with $SP_x$ 216 (a SP that offers, possibly inter alia, aspects of the present invention).

Figure 3:
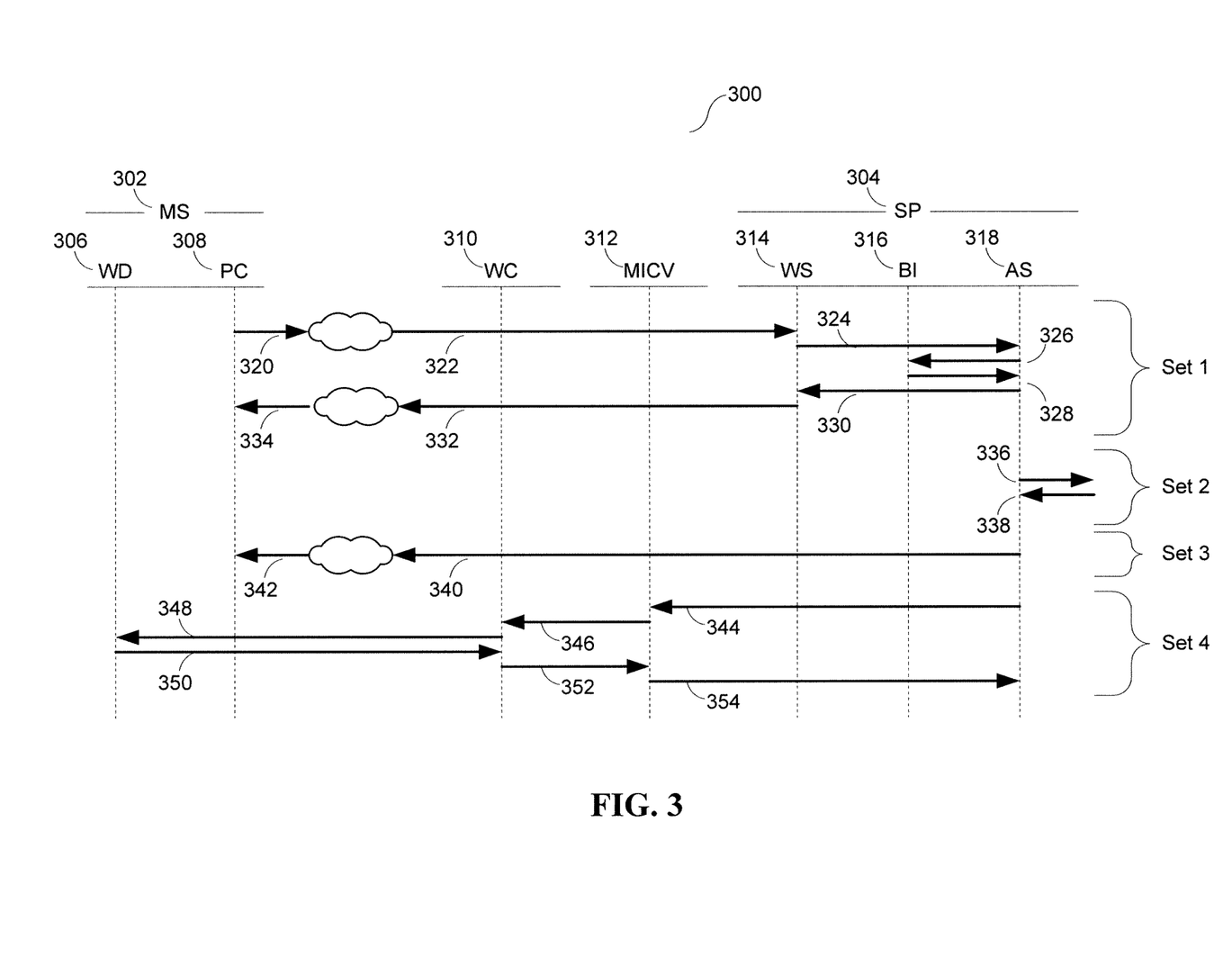
FIG. 3 illustrates various of the exchanges or interactions that are possible during an optional registration portion of the present invention.

FIG. 3 and reference numeral 300 illustrate various of the exchanges or interactions that might occur under an optional registration portion of our hypothetical example. Among other things a registration process may be tailored (e.g., the range of information gathered, the scope of services subsequently offered, etc.) to the class of user—e.g., possibly inter alia different types, categories, etc. of users may complete different registration processes. Of interest and note in the diagram are the following entities:

MS 302 WD 306. For example, Mary's 302 WD such as mobile telephone, BlackBerry, PalmPilot, etc.

MS 302 Personal Computer (PC) 308. For example, one of Mary's 302 home, work, etc. PCs.

WC 310. The provider of service for Mary's 302 WD 306.

MICV 312. As noted above the use of a MICV, although not required, provides significant advantages.

SP 304 Web Server (WS) 314. A publicly-available WWW site that is optionally provided by $SP_x$ 304.

SP 304 Billing Interface (BI) 316. A single, consolidated interface that $SP_x$ 304 may use to easily reach, possibly inter alia, one or more external entities such as a credit card or debit card clearinghouse, a carrier billing system, a service bureau that provides access to multiple carrier billing systems, etc.

SP 304 AS 318. Facilities that provide key elements of the instant invention (which will be described below).

It is important to note that while in FIG. 3 the MS 302 WD 306 and MS 302 PC 308 entities are illustrated as being adjacent or otherwise near each other, in actual practice the entities may, for example, be physically located anywhere.

In FIG. 3 the exchanges that are collected under the designation Set 1 represent the activities that might take place as Mary 302 completes a registration process with $SP_x$ 304:

A) Mary 302 uses one of her PCs 308 to visit a WS 314 of $SP_x$ 304 to, possibly among other things, complete a service registration process (320→322).

B) A WS 314 of $SP_x$ 304 interacts with an AS 318 of $SP_x$ 304 to, possibly among other things, commit some or all of the information that Mary 302 provided to a data repository (e.g., a database), optionally complete a billing transaction, etc. (324).

C) As appropriate and as required a BI 316 completes a billing transaction (326→328).

D) After receiving a response from an AS 318 of $SP_x$ 304 (330) a WS 314 of $SP_x$ 304 responds appropriately (e.g., with the presentation of a confirmation message, etc.) (332→334).

The specific exchanges that were described above (as residing under the designation Set 1) are illustrative only and it will be readily apparent to one of ordinary skill in the relevant art that numerous other exchanges are easily possible and indeed are fully within the scope of the present invention. For example, the collected information may be reviewed, confirmed, etc. through one or more manual and/or automatic mechanisms. For example, the registration process may be completed through any combination of one or more channels including, inter alia, the WWW (via, for example, a Web site that is operated by $SP_x$ 304), wireless messaging (SMS, MMS, etc.), E-Mail messages, Instant Messaging (IM), conventional mail, telephone, Interactive Voice Response (IVR) facility, etc.

During the registration process described above a range of information may be captured from a MS including, inter alia:

A) Identifying Information. For example, possibly among other things, name, address, landline and wireless Telephone Numbers (TNs), E-Mail addresses, IM names/identifiers, a unique identifier and a password, etc.

B) Personal Information. For example, possibly among other things, the particulars of a MS' WD(s) (including, possibly inter alia, TN, manufacturer, model number, features and capabilities, limitations, etc.).

C) Billing Information. Different service billing models may be offered including, inter alia, a fixed one-time charge, a recurring (monthly, etc.) fixed charge, a recurring (monthly, etc.) variable charge, a per-event charge, etc. Different payment mechanisms may be supported including, possibly among other things, credit or debit card information, authorization to place a charge on a MS's phone bill, authorization to deduct funds from a MS' (bank, brokerage, etc.) account, etc.

D) Other Information. Additional, possibly optional, information such as, for example, further Identifying Information; further Personal Information; etc.

The specific pieces of information that were described above are illustrative only and it will be readily apparent to one of ordinary skill in the relevant art that numerous other pieces of information (e.g., scheduled daily/weekly/etc. reporting desired and/or on-demand reporting desired, etc.) are easily possible and indeed are fully within the scope of the present invention.

As noted above the information that Mary provided during the registration process may be preserved in a data repository (e.g., a database) and may optionally be organized as a MS Profile.

The content of Mary's profile may be augmented by $SP_x$ to include, as just a few examples of the many possibilities, internal and/or external demographic, psychographic, sociological, etc. data.

As noted above, a SP's BI may optionally complete a billing transaction. The billing transaction may take any number of forms and may involve different external entities (e.g., a WC's billing system, a carrier billing system service bureau, a credit or debit card clearinghouse, a financial institution, etc.). The billing transaction may include, possibly inter alia:

1) The appearance of a line item charge on the bill or statement that a MS receives from her WC. Exemplary mechanics and logistics associated with this approach are described in pending U.S. patent application Ser. No. 10/837, 695 entitled "SYSTEM AND METHOD FOR BILLING AUGMENTATION." Other ways of completing or performing line item billing are easily implemented by those skilled in the art.

2) The charging of a credit card or the debiting of a debit card.

3) The (electronic, etc.) transfer of funds.

4) The generation of an invoice, account statement, etc.

In FIG. 3 the exchanges that are collected under the designation Set 2 represent the activities that might take place as $SP_x$ 304 optionally coordinates, etc. with one or more external entities (such as, for example, WCs, etc.) to, possibly among other things, secure access, confirm collected information, arrange to receive updates, etc. (see 336→338).

The specific exchanges that were described above (as residing under the designation Set 2) are illustrative only and it will be readily apparent to one of ordinary skill in the relevant art that numerous other exchanges (including, inter alia, updates to various of the information in a MS Profile in a SP's repository, etc.) are easily possible and indeed are fully within the scope of the present invention.

In FIG. 3 the exchanges that are collected under the designation Set 3 represent the activities that might take place as an AS 318 of $SP_x$ 304 dispatches to Mary 302 one or more confirmation E-Mail, IM, etc. messages (340→342).

The specific exchanges that were described above (as residing under the designation Set 3) are illustrative only and it will be readily apparent to one of ordinary skill in the relevant art that numerous other exchanges are easily possible and indeed are fully within the scope of the present invention.

In FIG. 3 the exchanges that are collected under the designation Set 4 represent the activities that might take place as an AS 318 of $SP_x$ 304 dispatches one or more confirmation SMS/MMS/etc., IM, etc. messages to Mary's 302 WD 306 (344→348) and Mary 302 optionally replies or responds to the message(s) (350→354). Of interest and note are:

1) In the instant example the messages are shown traversing a MICV 312.

2) The SP 304 may employ a Short Code (SC) or a regular TN as its source address (and to which it would ask users of its service to direct any reply messages). While the abbreviated length of a SC (e.g., five digits for a SC administered by Neustar under the Common Short Code [CSC] program) incrementally enhances the experience of a MS 302 (e.g., the MS 302 need remember and enter only a few digits as the destination address of a reply message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "UNIVERSAL SHORT CODE ADMINISTRATION FACILITY."

The specific exchanges that were described above (as residing under the designation Set 4) are illustrative only and it will be readily apparent to one of ordinary skill in the relevant art that numerous other exchanges are easily possible and indeed are fully within the scope of the present invention. For example, the messaging sequence (344→348) and (350→354) may be repeated any number of times.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention. For example, possibly inter alia, the registration information that was described above may subsequently be managed (e.g., existing information may be edited or removed, new information may be added, etc.) through any combination of one or more channels including, inter alia, a SP's WWW facility, wireless messaging (SMS, MMS, etc.), E-Mail messages, IM exchanges, conventional mail, telephone, IVR facilities, etc.

To continue with our hypothetical example . . . as Mary goes about her daily activities occasions may arise where she would like to use her WD to exchange MMS messages.

Figure 4:
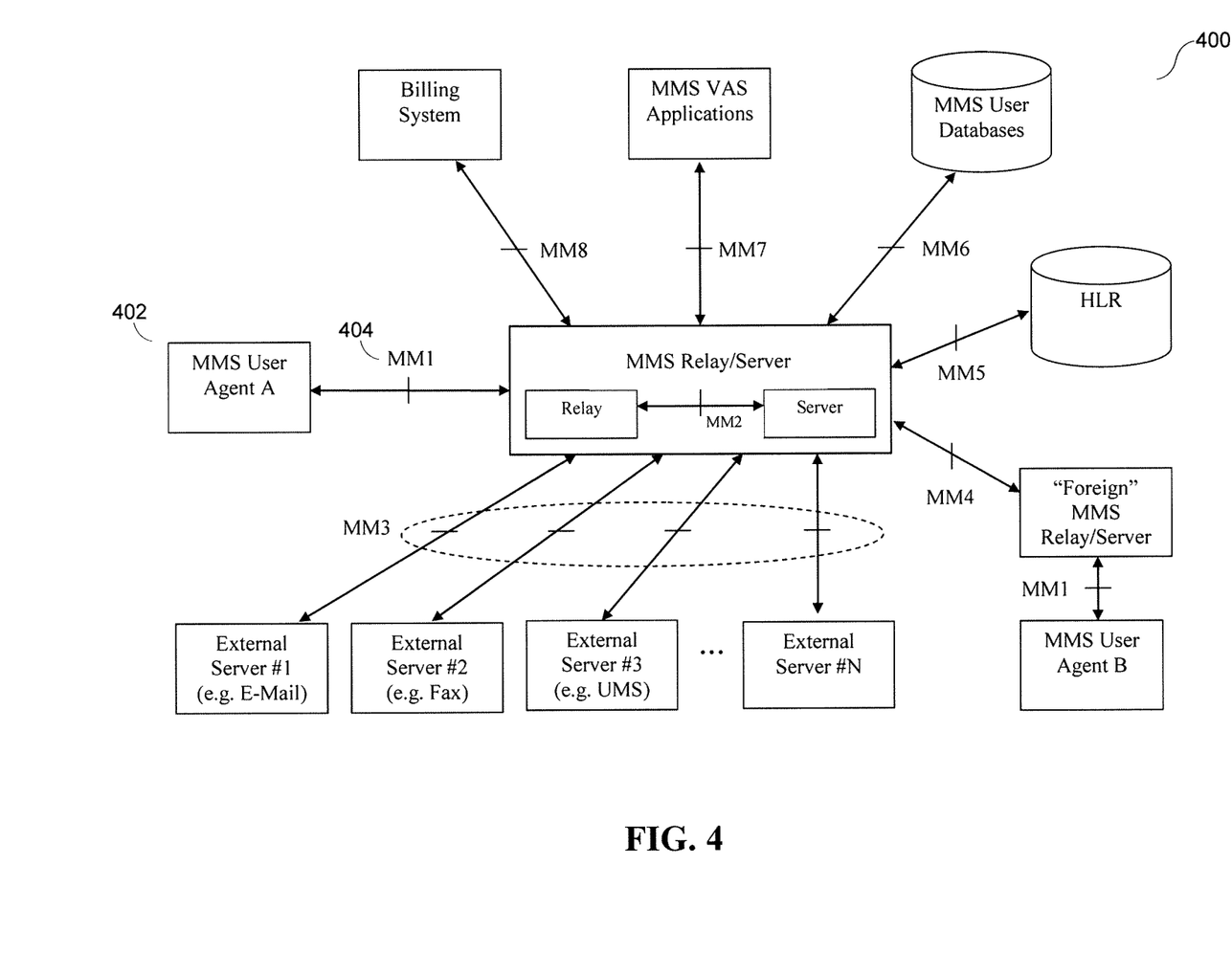
FIG. 4 depicts an MMS Reference Architecture as defined by the Third Generation Partnership Project (3GPP) (3gpp.org on the WWW).

As an aside, Technical Specification TS 23.140 from the 3GPP presents an MMS Reference Architecture that, as illustrated through FIG. 4 and reference numeral 400, defines a range of standards-based interfaces or channels through which an exchange of MMS messages may be completed:

| Interface | Description |
| --- | --- |
| MM1 | The interface between an MMS User Agent and an MMS Relay/Server |
| MM2 | The interface between an MMS Relay and an MMS Server |
| MM3 | The interface between an MMS Relay/Server and external (legacy) systems |
| MM4 | The interface between two MMS Relay/Server instances |
| MM5 | The interface between an MMS Relay/Server and a HLR |
| MM6 | The interface between an MMS Relay/Server and an MMS User Database |
| MM7 | The interface between an MMS Relay/Server and an MMS VAS Application |
| MM8 | The interface between an MMS Relay/Server and a billing system |

For example, a MM1 interface 404 may be employed (by, for example, an aspect or element of a WC) to exchange a MMS message with a MMS User Agent 402 (such as, for example, a WD).

Returning to our hypothetical example . . . one or more limitations may preclude Mary from completing her MMS message exchange. For example:

1) Mary may wish to receive a MMS message but her WD may not provide native support for MMS.

2) Mary's physical location may limit the level, type, etc. of WC-supplied service that her WD may enjoy and thus, possibly inter alia, constrain her ability to fully use her WD's native facilities for the exchange of MMS messages.

The specific examples that were cataloged above are illustrative only and it will be readily apparent to one of ordinary skill in the relevant art that numerous other examples are easily possible and indeed are fully within the scope of the present invention.

Under the sort of circumstances that were cataloged above, and under other circumstances that would be readily apparent to one of ordinary skill in the relevant art, an alternate message delivery channel such as, possibly inter alia, E-Mail may be leveraged to complete Mary's MMS message exchange.

Figure 5:
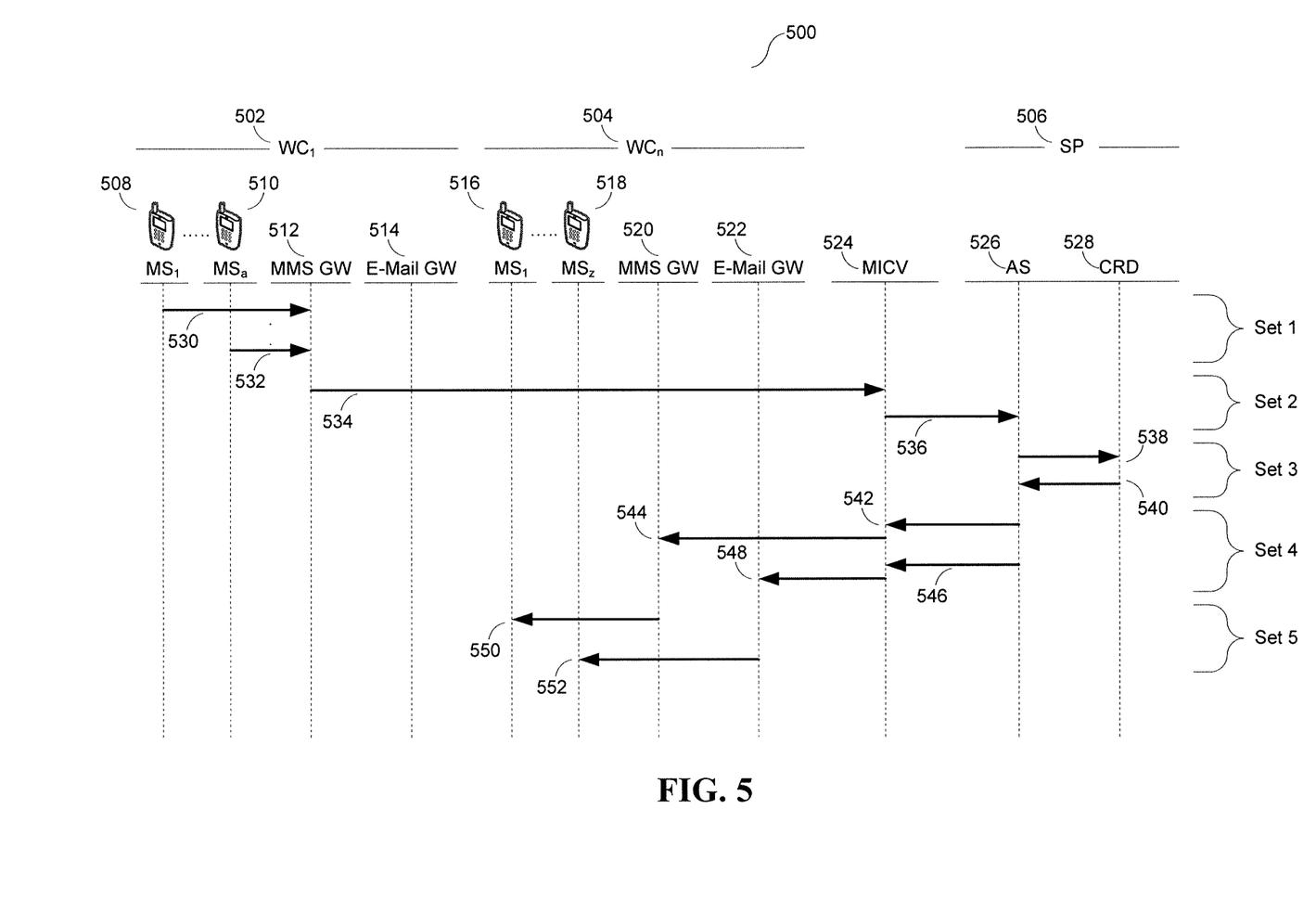
FIG. 5 illustrates various of the exchanges or interactions that are supported by aspects of the present invention.

FIG. 5 and reference numeral 500 provide a framework within which such an alternate message delivery channel may be examined vis-à-vis aspects of the present invention. Of interest and note in the diagram are the following entities:

$WC_1$ 502 and $WC_n$ 504. Exemplary WCs.

SP 506. $SP_x$, a SP that, possibly inter alia, offers a service that has been enhanced or augmented as provided through aspects of the instant invention $MS_1$ 508→$MS_a$ 510. Exemplary MSs of $WC_1$ 502.

MMS Gateway (GW) 512. A MMS messaging facility (e.g., a gateway, a MMS Center [MMSC], etc.) that is provided by $WC_1$ 502.

E-Mail GW 514. An E-Mail facility (e.g., a gateway, etc.) that is provided by $WC_1$ 502.

$MS_1$ 516→$MS_z$ 518. Exemplary MSs of $WC_n$ 504.

MMS GW 520. A MMS messaging facility (e.g., a gateway, a MMSC, etc.) that is provided by $WC_n$ 504.

E-Mail GW 522. An E-Mail facility (e.g., a gateway, etc.) that is provided by $WC_n$ 504.

MICV 524. As noted above the use of a MICV, although not required, provides significant advantages.

SP 506 AS 526. Facilities that provide key elements of the instant invention (which will be described below).

SP 506 Composite Routing Data (CRD) 528. A repository of, possibly inter alia, WC, TN, etc. information that may be populated and updated through any number of mechanisms (e.g., static, dynamic, both) and which, possibly among other things, supports the proper routing of messages. The CRD will be described further below.

In FIG. 5 the exchanges that are collected under the designation Set 1 represent the activities that might take place as MSs (e.g., $MS_1$ 508→$MS_a$ 510) of $WC_1$ 502 compose MMS messages to Mary (as a MS [$MS_1$ 516→$MS_z$ 518] of $WC_n$ 504) and subsequently dispatch the messages (530→532).

The specific exchanges that were described above (as residing under the designation Set 1) are illustrative only and it will be readily apparent to one of ordinary skill in the relevant art that numerous other exchanges are easily possible and indeed are fully within the scope of the present invention. For example, a WC may optionally respond to a received message, complete various processing steps, etc.

In FIG. 5 the exchanges that are collected under the designation Set 2 represent the activities that might take place as the MMS messages leave $WC_1$ 502, travel through a MICV 524 (via 534), and ultimately arrive at an AS 526 of $SP_x$ 506 (via 536).

The specific exchanges that were described above (as residing under the designation Set 2) are illustrative only and it will be readily apparent to one of ordinary skill in the relevant art that numerous other exchanges are easily possible and indeed are fully within the scope of the present invention.

In FIG. 5 the exchanges that are collected under the designation Set 3 represent the activities that might take place as an AS 526 of $SP_x$ 506, possibly inter alia, completes a series of processing steps. During its processing steps an AS 526 may employ any combination of a number of automated (e.g., through software solutions) and/or manual (e.g., through human intervention) techniques, activities, etc., to possibly inter alia:

A) Extract one or more data elements from a received message 536 and optionally perform various edit, validation, etc. operations on the extracted data elements. The data elements may include, possibly inter alia, a message's destination address (e.g., TN).

B) Using a destination address query a CRD 528 (via 538→540) to identify, possibly inter alia, (i) the WC that presently services the destination address and (ii) if native MMS support is present on the WD (that is associated with the destination address). If the destination address is not found within the CRD then one or more additional processing steps, described in detail below, may optionally be initiated before proceeding on to the next step.

C) Based on the identified capabilities, features, limitations, etc. of the destination WD, determine if it is possible to natively deliver the MMS message to the destination WD. If it is possible, then arrange to dispatch the MMS message to the MMS GW 520 of $WC_n$ 504 (as the MMS messaging facility of destination WC $WC_n$ 504). If it is not possible then, possibly inter alia, transcode the content or the body of the MMS message (as appropriate and as required), construct an E-Mail message containing possibly among other things the (possibly transcoded) MMS message content, and arrange to dispatch the E-Mail message to the E-Mail GW 522 of $WC_n$ 504 (as the E-Mail facility of destination WC $WC_n$ 504).

The catalog of processing steps that was described above is illustrative only and it will be readily apparent to one of ordinary skill in the relevant art that numerous other processing steps are easily possible and indeed are fully within the scope of the present invention.

Additionally, various of the processing steps that were described above may leverage information that was collected from a MS during an optional registration process.

As well, various of the processing steps that were described above may have associated with it, possibly inter alia, an optional set of weighting, scoring, confidence, etc. factors that may be used, either individually or together, to develop possibly among other things the desired results.

As described above a CRD may be queried to identify key items (including, for example, [1] the WC that presently services a destination address [e.g., TN] and the presence/absence of native MMS support on the WD that is associated with the destination address). A CRD query may include and/or trigger any combination of one or more mechanisms, including possibly inter alia:

1) Data Load. A SP may receive a data feed, data dump, etc. from one or more external sources (such as, possibly inter alia, WCs) on a real-time basis, on a periodic (e.g., scheduled or dynamic) basis, on an on-demand (e.g., as needed) basis, etc. The received information may contain, possibly inter alia, the TNs of various of a WC's MSs along with, as just one example, the particulars (e.g., feature/function capabilities, limitations, etc.) of the WD that is associated with a TN. Aspects of the received information (following optional internal processing, etc.) may be preserved in the CRD (by, as just one example, associating the information to the TN's entry/entries in the CRD) for subsequent query.

2) WC Query. For a particular TN a SP may initiate inquiries against one or more external sources (such as, possibly inter alia, different elements of the WC that services the TN such as a HLR, a provisioning facility, a billing facility, etc.). Such inquiries may return, possibly inter alia, the particulars (e.g., feature/function capabilities, limitations, etc.) of the WD that is associated with the TN. Aspects of the received particulars (following optional internal processing, etc.) may be preserved in the CRD (by, as just one example, associating the information to the TN's entry/entries in the CRD) for subsequent query.

3) WD Query. For a particular TN a SP may interrogate the WD that is associated with the TN. As just one example:

a) A SP may dispatch to the WD (i.e., to the TN) an MMS message containing just a textual message (such as, for example, "Your request is being processed . . . ").

b) The MMS message may include, possibly inter alia, a request for a message delivery report.

c) After the MMS message is delivered by a WC to the WD a message delivery report may be returned to the SP.

d) A received message delivery report may (as defined by the applicable 3GPP standards) contain, possibly inter alia, various of the particulars (e.g., feature/function capabilities, limitations, etc.) of the WD.

e) Aspects of the received particulars (following optional internal processing, etc.) may be preserved in the CRD (by, as just one example, associating the information to the TN's entry/entries in the CRD) for subsequent query.

Figure 6:
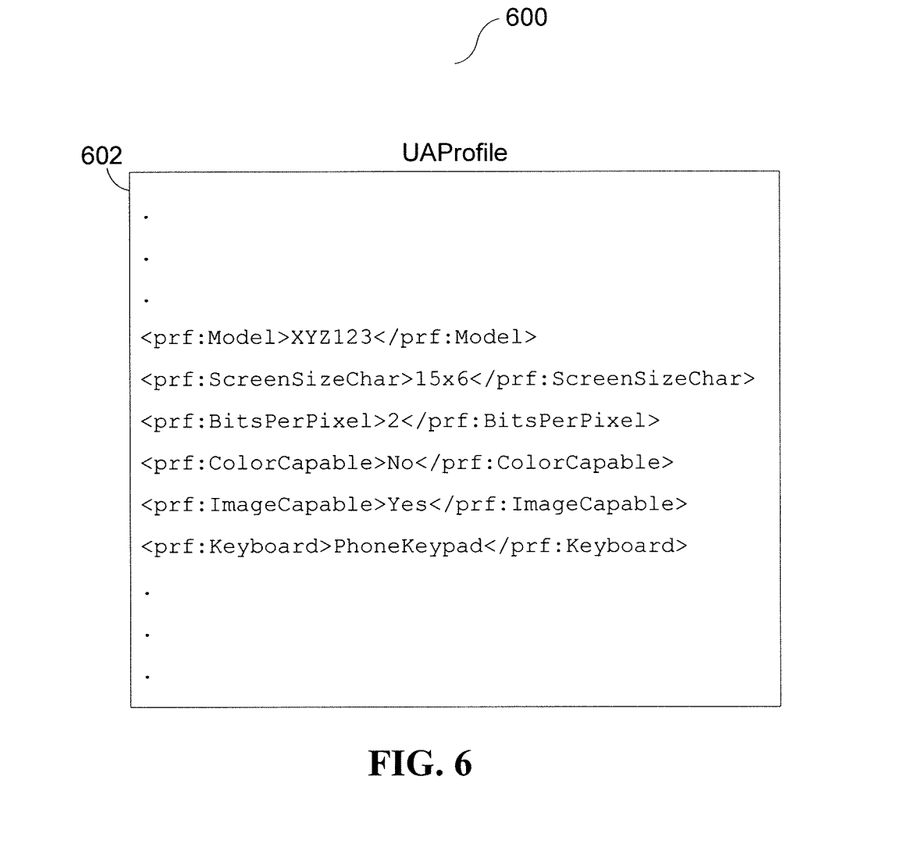
FIG. 6 illustrates aspects of a hypothetical User Agent Profile (UAProfile).

Various of the activities that were described above may employ a UAProfile—e.g., a UAProfile may be returned to a SP in a (e.g., delivery report, etc.) message; a UAProfile may be retrieved from one or more public or private (manufacturer, etc.) repositories based on, possibly inter alia, WD manufacturer, model, etc. information that may be returned to a SP; etc. As illustrated by FIG. 6 and reference numeral 600, a UAProfile 602 is a small Extensible Markup Language (XML) file that is defined by the World Wide Web Consortium (W3C) and which describes the particulars of a WD. A UAProfile may include, possibly inter alia, details for vendor, model, screen size, messaging capabilities, multimedia support, character set support, etc.

The catalog of mechanisms that was described above is illustrative only and it will be readily apparent to one of ordinary skill in the relevant art that numerous other mechanisms are easily possible and indeed are fully within the scope of the present invention.

The specific exchanges that were described above (as residing under the designation Set 3) are illustrative only and it will be readily apparent to one of ordinary skill in the relevant art that numerous other exchanges are easily possible and indeed are fully within the scope of the present invention.

In FIG. 5 the exchanges that are collected under the designation Set 4 represent the activities that might take place as an AS 526 of $SP_x$ 506, possibly inter alia, dispatches the MMS message to Mary (as a MS [$MS_1$ 516→$MS_z$ 518] of $WC_n$ 504):

1) If native message delivery is available then as a MMS message to MMS GW 520 of $WC_n$ 504 (via 542→544), or 2) If an alternate message delivery channel is employed then as (in the instant example) an E-Mail message to E-Mail GW 522 of $WC_n$ 504 (via 546→548).

In the instant example the messages are shown traversing a MICV 524. The messaging sequence (542→544 or 546→548) may be repeated any number of times.

The specific exchanges that were described above (as residing under the designation Set 4) are illustrative only and it will be readily apparent to one of ordinary skill in the relevant art that numerous other exchanges are easily possible and indeed are fully within the scope of the present invention.

In FIG. 4 the exchanges that are collected under the designation Set 5 represent the activities that might take place as the message is delivered to Mary (as a MS [$MS_1$ 516→$MS_z$ 518] of $WC_n$ 504)—from MMS GW 520 (via 550) or from E-Mail GW 522 (via 552). The messaging sequence (550 or 552) may be repeated any number of times.

The specific exchanges that were described above (as residing under the designation Set 5) are illustrative only and it will be readily apparent to one of ordinary skill in the relevant art that numerous other exchanges are easily possible and indeed are fully within the scope of the present invention. For example, a MS may optionally respond or reply to a received message (in which case the reverse of the activities that were described above would take place).

The Set 1, Set 2, Set 3, Set 4, and Set 5 exchanges that were described above are illustrative only and it will be readily apparent to one of ordinary skill in the relevant art that numerous other exchanges are easily possible and indeed are fully within the scope of the present invention. For example, during various of the activities that were described above an SP may offer any number of other optional services, capabilities, etc. including, possibly inter alia:

1) If an alternate message delivery channel is employed a SP may generate an artificial MM4_forward.RES message for delivery back to an originating WC (so that it appears to the originating WC that the MMS message was, in fact, delivered natively to the destination WD).

2) If an alternate message delivery channel is employed a SP may generate other artificial messages (such as, possibly inter alia, MM4_delivery_report.*, MM4_read-reply_report.*, etc.), as appropriate and as required.

3) An SP may augment the CRD query activities that were described above to include, possibly inter alia, information on a WD's current physical location and given same various of the particulars of the WC-supplied service(s) that the WD currently enjoys. Such information may be developed through any combination of one or more facilities like Location-Based Service (LBS), Global Positioning System (GPS), variations on the 'WC Query' mechanism that was described above, etc.

The confirmation, delivery, etc. message(s) that were described above may optionally contain an informational element—e.g., a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a LBS, GPS, etc. facility).

The confirmation, delivery, etc. message(s) that were identified above may optionally contain advertising—e.g., possibly textual material if an SMS model is being utilized, possibly multimedia (images of brand logos, sound, video snippets, etc.) material if an MMS model is being utilized, etc. The advertising material may be selected statically (e.g., all generated messages are injected with the same advertising material that is, for example, selected from a pool of available material), randomly (e.g., a generated message is injected with advertising material that is, for example, randomly selected from a pool of available material), or location-based (i.e., a generated message is injected with advertising material that is, for example, selected from a pool of available material based on the current physical location of the recipient of the message as derived from, as one example, a LBS, GPS, etc. facility). Third parties (such as, for example, advertising agencies, brands, etc.) may contribute advertising material to a SP's pool of advertising material.

The confirmation, delivery, etc. message(s) that were identified above may optionally contain promotional materials (e.g., still images, video clips, etc.).

Figure 7:
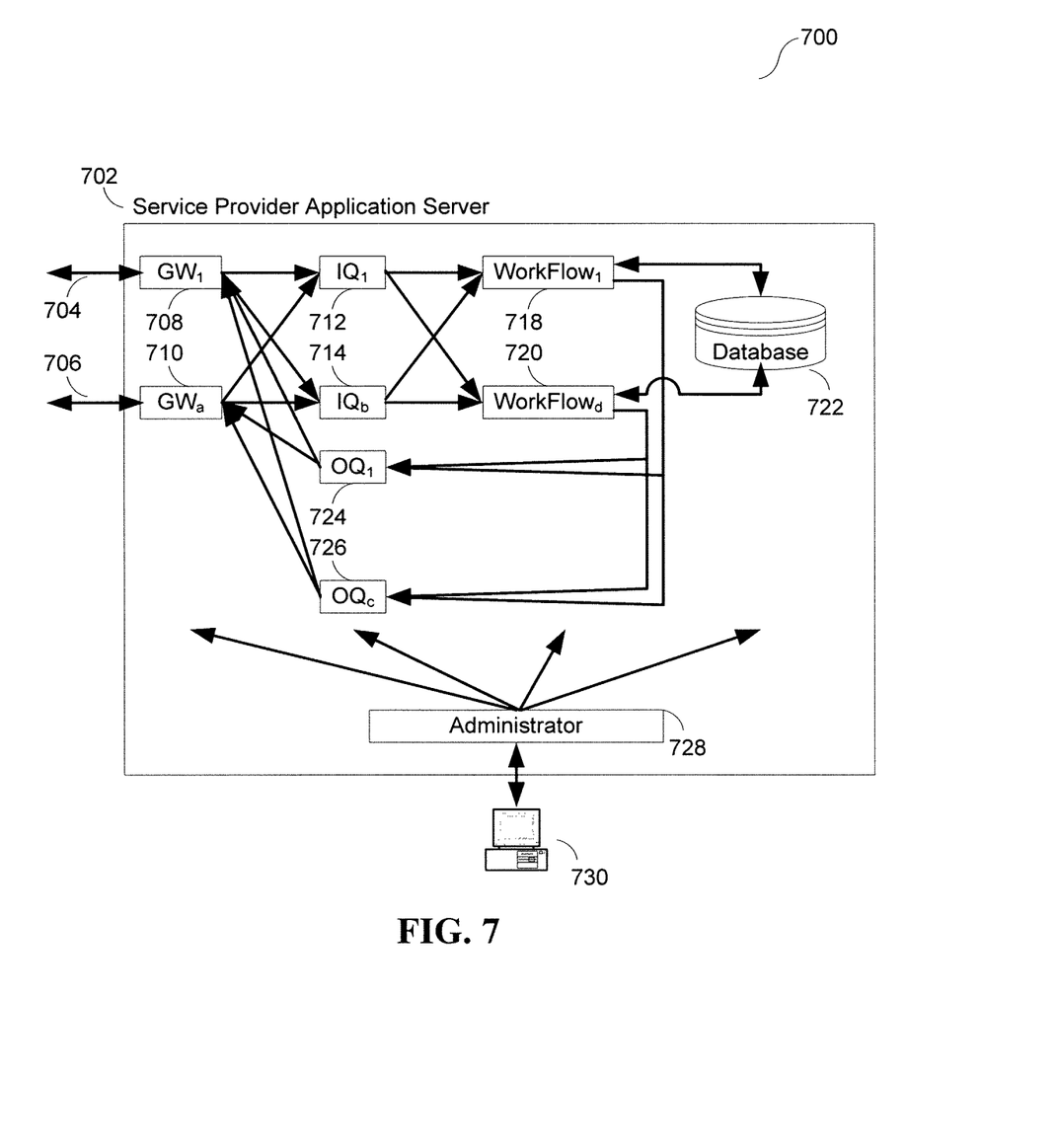
FIG. 7 is a diagrammatic presentation of aspects of an exemplary Service Provider (SP) Application Server (AS).

FIG. 7 and reference numeral 700 provides a diagrammatic presentation of aspects of an exemplary SP AS 702. The illustrated AS 702 contains several key components—Gateways ($GW_1$ 708→$GW_a$ 710 in the diagram), Incoming Queues ($IQ_1$ 712→$IQ_b$ 714 in the diagram), WorkFlows ($WorkFlow_1$ 718→$WorkFlow_d$ 720 in the diagram), Database 722, Outgoing Queues ($OQ_1$ 724→$OQ_c$ 726 in the diagram), and an Administrator 728. It will be readily apparent to one of ordinary skill in the relevant art that numerous other components are possible within an AS 702.

A dynamically updateable set of one or more Gateways ($GW_1$ 708→$GW_a$ 710 in the diagram) handle incoming (E-mail, SMS/MMS/etc., IM, etc. messaging, etc.) traffic (704→706) and outgoing (E-mail, SMS/MMS/etc., IM, messaging, etc.) traffic (704→706). Incoming traffic (704→706) is accepted and deposited on an intermediate or temporary Incoming Queue ($IQ_1$ 712→$IQ_b$ 714 in the diagram) for subsequent processing. Processed artifacts are removed from an intermediate or temporary Outgoing Queue ($OQ_1$ 724→$OQ_c$ 726 in the diagram) and then dispatched (704→706).

A dynamically updateable set of one or more Incoming Queues ($IQ_1$ 712→$IQ_b$ 714 in the diagram) and a dynamically updateable set of one or more Outgoing Queues ($OQ_1$ 724→$OQ_c$ 726 in the diagram) operate as intermediate or temporary buffers for incoming and outgoing traffic (704→706).

A dynamically updateable set of one or more WorkFlows ($WorkFlow_1$ 718→$WorkFlow_d$ 720 in the diagram) remove incoming traffic (704→706) from an intermediate or temporary Incoming Queue ($IQ_1$ 712→$IQ_b$ 714 in the diagram), perform all of the required processing operations, and deposit processed artifacts on an intermediate or temporary Outgoing Queue ($OQ_1$ 724→$OQ_c$ 726 in the diagram). The WorkFlow component will be described more fully below.

The Database 722 that is depicted in FIG. 7 is a logical representation of the possibly multiple physical repositories that may be implemented to support, inter alia, routing (such as CRD), configuration, profile, etc. information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

An Administrator 728 that is depicted in FIG. 7 provides management or administrative control over all of the different components of an AS 702 through, as one example, a WWW-based interface 730. It will be readily apparent to one of ordinary skill in the relevant art that numerous other interfaces (e.g., a data feed, an Application Programming Interface [API], etc.) are easily possible.

Through flexible, extensible, and dynamically updatable configuration information a WorkFlow component may be quickly and easily realized to support any number of activities. For example, WorkFlows might be configured to support a registration process; to support interactions with external entities (such as, for example, different elements of a WC such as a HLR, a provisioning facility, a billing facility, etc.); to support the population of a CRD; to support various internal processing steps (as described above) including, possibly inter alia, (1) the extraction of data elements from received messages and the optional editing, validating, etc. of same, (2) the querying of a CRD and optional inquiries to external entities, (3) the generation and dispatch of outgoing messages; to support the generation and dispatch of confirmation, etc. messages; to support various billing transactions; to support the generation of scheduled and/or on-demand reports; etc. The specific WorkFlows that were just described are exemplary only; it will be readily apparent to one of ordinary skill in the relevant art that numerous other WorkFlow arrangements, alternatives, etc. are easily possible.

A SP may maintain a repository (e.g., a database) into which selected details of all administrative, messaging, etc. activities may be recorded. Among other things, such a repository may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, etc. messages; through E-Mail; through a WWW-based facility; etc.

It is important to note that while aspects of the discussion that was presented above referenced the use of TNs, SCs, etc. it will be readily apparent to one of ordinary skill in the relevant art that other message address identifiers are equally applicable and, indeed, are fully within the scope of the present invention.

The discussion that was just presented referenced several specific messaging paradigms including MMS, E-Mail, etc. These paradigms potentially offer an incremental advantage over other paradigms in that native support may be commonly found on a WD that a potential MS would be carrying. However, it is to be understood that it would be readily apparent to one of ordinary skill in the relevant art that numerous other paradigms (such as, for example, SMS, IM, Internet Protocol [IP] Multimedia Subsystem [IMS], Wireless Application Protocol [WAP], etc.) are easily possible and, indeed, are fully within the scope of the present invention.

It is important to note that the hypothetical example that was presented above, which was described in the narrative and which was illustrated in the accompanying figures, is exemplary only. It is not intended to be exhaustive or to limit the invention to the specific forms disclosed. It will be readily apparent to one of ordinary skill in the relevant art that numerous alternatives to the presented example are easily possible and, indeed, are fully within the scope of the present invention.

The following list defines acronyms as used in this disclosure.

| Acronym | Meaning |
| --- | --- |
| API | Application Programming Interface |
| AS | Application Server |
| BI | Billing Interface |
| CRD | Composite Routing Data |
| CSC | Common Short Code |
| DBMS | Database Management System |
| E-Mail | Electronic Mail |
| GIS | Geographic Information System |
| GPS | Global Positioning System |
| GW | Gateway |
| HLR | Home Location Register |
| IM | Instant Messaging |
| IMS | IP Multimedia Subsystem |
| IP | Internet Protocol |
| IQ | Incoming Queue |
| IVR | Interactive Voice Response |
| LBS | Location-Based Service |
| MICV | Messaging Inter-Carrier Vendor |
| MMS | Multimedia Message Service |
| MMSC | Multimedia Message Service Center |
| MS | Mobile Subscriber |
| ODBMS | Object Database Management System |
| OQ | Outgoing Queue |
| PC | Personal Computer |
| RDBMS | Relational Database Management System |
| SC | Short Code |
| SMS | Short Message Service |
| SP | Service Provider |
| 3GPP | Third Generation Partnership Project |
| TN | Telephone Number |
| UAProfile | User Agent Profile |
| W3C | World Wide Web Consortium |
| WAP | Wireless Application Protocol |
| WC | Wireless Carrier |
| WD | Wireless Device |
| WF | WorkFlow |
| WS | Web Server |
| WWW | World-Wide Web |
| XML | Extensible Markup Language |

What is claimed is:

1. A method for delivering a Multimedia Message Service (MMS) message, comprising:
receiving from a device of an originating mobile subscriber a MMS message that is addressed to a telephone number of a device of a destination mobile subscriber;
performing at least one processing step on aspects of the MMS message, including at least querying a routing data repository, yielding at least an MMS support descriptor for the device of the destination mobile subscriber;
responsive to the MMS support descriptor indicating the absence of MMS support on the device of the destination mobile subscriber sending at least aspects of the MMS message through an e-mail delivery channel;
wherein the routing data repository is populated through one or more of (a) data load and (b) real-time query,
wherein the real-time query includes interrogation of the device of the destination mobile subscriber, and
wherein the real-time query of the device of the destination mobile subscriber is triggered as a result of the processing step of querying the routing data repository, which is triggered by receipt of the MMS message.

2. The method of claim 1, wherein the sending at least aspects of the MMS message includes one or more of (a) original portions of the MMS message and (b) transcoded portions of the MMS message.

3. The method of claim 1, wherein the routing data repository maintains at least a MMS support descriptor.

4. The method of claim 3, wherein the MMS support descriptor is based on at least aspects of a User Agent Profile.

5. The method of claim 1, wherein the real-time query includes interrogation of at least one carrier network element.

6. The method of claim 5, wherein the carrier network element is a Home Location Register.

7. The method of claim 1, wherein the interrogation of the device of the destination mobile subscriber includes the sending of a text-only MMS message.

8. The method of claim 7, wherein the text-only MMS message includes a request for a message delivery report.

9. The method of claim 1, wherein the processing steps employ information previously supplied by the originating mobile subscriber.

10. The method of claim 9, wherein the information is defined by the originating mobile subscriber during a registration process.

11. The method of claim 10, wherein the information includes at least one of Identifying Information, Personal Information, and Billing Information.

12. The method of claim 10, wherein the information is preserved through a User Profile.

13. The method of claim 10, wherein the registration process is Web-based.

14. The method of claim 10, wherein the registration process includes a billing component.

15. The method of claim 1, further comprising:
generating at least one artificial message that is delivered to an originating wireless carrier such that it appears to the originating wireless carrier that the MMS message was delivered natively to the device of the destination mobile subscriber when no such delivery actually occurred.

16. The method of claim 15, wherein the artificial message is a MM4_Forward.RES message.

* * * * *